April 24, 1934.  W. PAULUS  1,956,518
REAR VIEW MIRROR FOR FOLDING WINDSHIELD STANCHIONS
Filed June 26, 1930
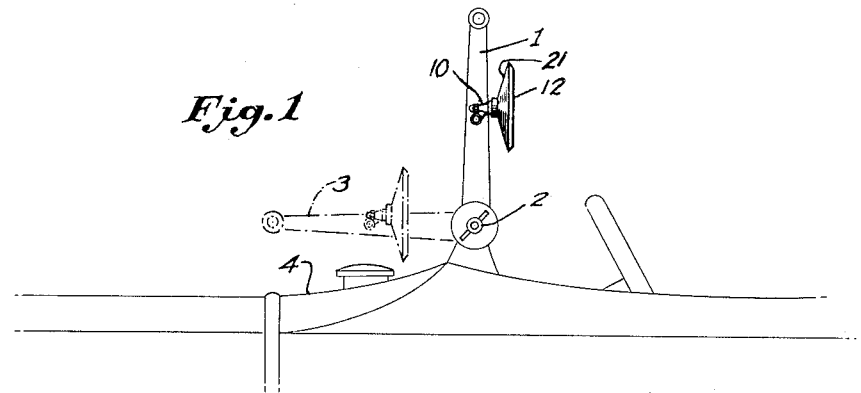
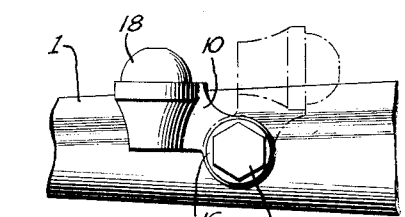
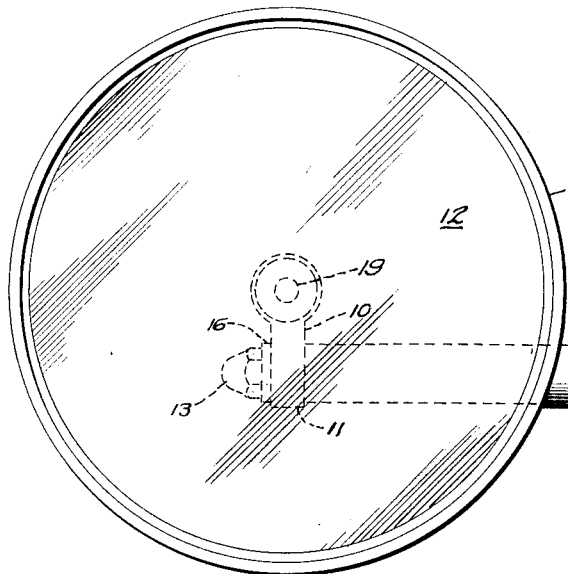
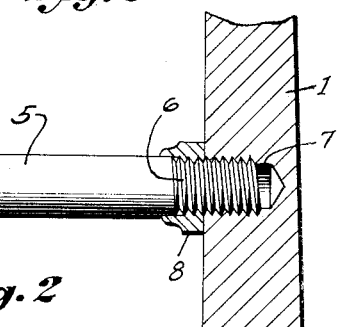
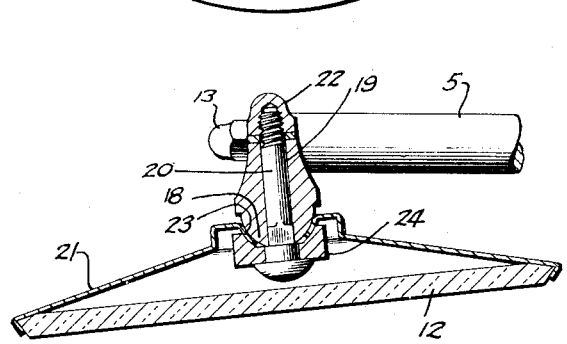
Inventor
William Paulus
By Barton A. Bean Jr.
Attorney Patented Apr. 24, 1934

1,956,518

UNITED STATES PATENT OFFICE 1,956,518

REAR VIEW MIRROR FOR FOLDING WINDSHIELD STANCHIONS

William Paulus, Buffalo, N. Y., assignor to Trico Products Corporation, Buffalo, N. Y.

Application June 26, 1930, Serial No. 463,942

2 Claims. (Cl. 45—97)

This invention relates to a rear view mirror for motor vehicles and is primarily adapted for use on windshields which may be downwardly folded out of the field of vision, such as are found in certain sport models and similar types of automobiles.

The usual rear view mirror is adapted for angular or universal adjustment within certain restrictions sufficient to enable the driver properly to observe the traffic conditions to the rear. However, the brackets which support the reflectors are designed for a fixed mounting or on a non-adjustable part of the windshield and therefore should the windshield be folded forwardly, carrying the bracket therewith, the limits of adjustment afforded the reflector are such as to prevent a serviceable readjustment of the reflector on its bracket and consequently a complete remounting of the mirror is necessitated if the same is to be used when the windshield is in its folded position.

The object of the present invention is to provide a windshield mounted mirror having a primary adjustment combined with a field selecting adjustment whereby the reflector can function in any and all positions of the windshield.

The invention is found also in the features of construction, their combinations and mounting relations hereinafter referred to and set forth in the appended claims, reference being had to the accompanying drawing wherein:—

Fig. 1 is a general showing of the improved mirror depicting its adaptability to different adjustments of the windshield.

Fig. 2 is an elevation of the mirror, with a fragment of the windshield frame or stanchion member illustrated in section.

Fig. 3 is a detail end elevation of the mirror bracket with a portion of the stanchion, and indicating by the dotted showing, the general adjustment of the bracket when the windshield is forwardly folded.

Fig. 4 is a disassembled perspective view of the reflector supporting portion of the bracket.

Fig. 5 is a sectional view through the reflector mounting.

Referring more in detail to the accompanying drawing the numeral 1 designates the left hand stanchion or windshield frame member pivoting about a horizontal axis 2 for swinging forwardly to the folded position 3 wherein it overlies the cowl 4 of the motor vehicle and is disposed below or out of the field of vision.

The rear view mirror may be connected directly to the stanchion in any desired manner and assume a shape or configuration in harmony with the general lines of the motor vehicle. In the present showing the bracket is depicted as being of simple bar-like design, as indicated at 5, having its inner end connected to the stanchion as through the instrumentality of threads 6 engaging in the socket 7 of the stanchion, a jam nut 8 being applied to the threads 6 to jam against the stanchion thereby to secure the bracket member 5 firmly to its mounting.

This bracket member is provided with a pivot or pintle 9 extended in a direction laterally from the stanchion and having its axis substantially parallel to the axis 2 about which the windshield has its adjustment. A reflector carrying arm 10 is provided with a hub 11 which receives the pivot 9 and by which the arm is permitted to swing thereabout. A nut 13 is threaded on a reduced portion 14 of the pivot 9 so as to firmly clamp the hub 11 frictionally against an inwardly disposed shoulder 15, a washer member 16 being interposed between the nut 13 and the hub 11 and keyed to the pivot 9 against relative rotation, as through the chordal faces 17 with which the opening of the washer 16 closely conforms. The arm therefore will be frictionally held at its primary adjustment between the shoulder 15 and the non-rotatable washer 16. This arm is designed to carry the reflector 12 for universal adjustment, within certain restrictions, whereby the reflector may be adjusted to give the driver the proper image reflection of the traffic conditions to the rear after the arm 10 has been given a general or primary adjustment about the pivot 9.

The universal adjustment herein illustrated consists of a bearing part 18 of dome or substantially hemispherical design and has its axis extending substantially at right angles to the axis of the pivot 9. The bearing part 18 is formed with an axial bore or opening 19 extending through the arm and is designed for receiving a reflector clamping bolt 20 the head of which is housed within the backing plate 21 of the reflector 12. A clamping nut 22 is threaded on the rearwardly protruding end of the bolt 20 at the opposite side of the arm, and the backing plate 21 is formed with a socket 23 to receive the bearing part 18, cooperating, in effect, in the capacity of a ball and socket joint. When the nut 22 is loosened the socket 23 is adjustable over the dome-like surface 18 and by tightening the nut 22 the clamping head part 24 of the bolt is brought firmly down upon the part 18 so as to secure the reflector in its selected adjustment.

When the windshield is in its raised, operative position, and with the arm 10 in the position illustrated in Fig. 1 it is only necessary for the driver to adjust the reflector about the ball part 18 in order to select the reflected field of vision to the rear. Now when the windshield structure is folded to its inoperative position the part 18 will move therewith to the position substantially as indicated by the solid line showing of Fig. 3 with the reflector facing upwardly. Ordinarily this renders the mirror inoperative and would necessitate a remounting of the bracket on the stanchion in order to operatively position the mirror, but in the present instance the operator can grasp the reflector and swing the arm, which is frictionally clamped, about the pivot 9 to obtain the primary adjustment, which adjustment, being made about an axis parallel to the axis about which the windshield has been moved, will bring the reflector to its operative position for reflecting substantially the same field as it did in the operative position of the windshield, disregarding the fact that the mirror has been moved slightly forward by such folding of the windshield. Consequently, the primary adjustment will not effect the field adjustment of the reflector although a finer adjustment may be made over the ball part 18, if desired. The axis of the dome part may be set at a slight angle to the path of adjustment of the arm 10, as indicated in Fig. 5, so as to direct the same more in line with the driver's eye and thereby enable the reflector to have a substantially uniform extent of adjustment thereabout.

What is claimed is:

1. The combination with a windshield supporting stanchion and means pivotally supporting the stanchion at its lower end for folding forwardly into a substantially forwardly extended position; of a rear view mirror, an arm adjustably connected to the mirror, a supporting member fixed on the stanchion and having a pivot part extending laterally from said stanchion in substantial parallelism with the axis of said pivotal supporting means for the stanchion, said mirror supporting arm having an opening receiving said pivot part for swingingly mounting the mirror for adjustment in accommodation of the folding of the stanchion to its forwardly lowered position and independently of the adjustable connection between the arm and mirror, and means securing said arm on said pivot part, said arm supporting the mirror being offset above the pivot part when in normal position.

2. A rear view mirror for mounting on a foldable stanchion of a windshield, comprising a bracket having means of attachment to the stanchion and provided with a laterally extending pivot, an arm formed with a hub, said hub being mounted on said pivot for primary adjustment thereabout in a plane substantially parallel to the plane of folding of the supporting stanchion, a reflector, and means adjustably connecting the reflector to said arm and constituting a secondary adjustment for field determination, said secondary adjustment embodying a bearing part formed on said arm with a bore therein extending substantially tangential of the pivot, there being means disposed in the bore of said bearing part for adjustably securing the reflector thereto.

WILLIAM PAULUS.